US007568283B2

(12) United States Patent
Gula

(10) Patent No.: US 7,568,283 B2

(45) Date of Patent: Aug. 4, 2009

(54) CIRCUIT BREAKER PULLOUT TOOL

(75) Inventor: Lance Gula, Clinton, PA (US)

(73) Assignee: Eaton Corporation, Cleveland, OH (US)

( * ) Notice: Subject to any disclaimer, the term of this patent is extended or adjusted under 35 U.S.C. 154(b) by 347 days.

(21) Appl. No.: 11/558,578

(22) Filed: Nov. 10, 2006

(65) Prior Publication Data

US 2008/0110297 A1 May 15, 2008

(51) Int. Cl.
*B23P 19/00* (2006.01)

(52) U.S. Cl. ............................ 29/764; 29/741; 29/742; 29/749; 29/760; 29/783

(58) Field of Classification Search ................ 29/81.17, 29/564, 741, 742.749, 760, 783, 764; 439/620.08; 200/43.01, 43.11, 43.14, 43.07, 50.11; 218/155, 218/154, 157

See application file for complete search history.

(56) References Cited

U.S. PATENT DOCUMENTS

| | | | | |
|---|---|---|---|---|
| 4,392,301 | A * | 7/1983 | Hannes et al. | 29/741 |
| 5,349,145 | A * | 9/1994 | Kelaita et al. | 200/43.15 |
| 6,137,068 | A * | 10/2000 | Padulo | 200/43.16 |
| 6,444,931 | B1 * | 9/2002 | Bartek et al. | 200/307 |
| 6,800,823 | B1 | 10/2004 | Malingowski et al. | |

* cited by examiner

*Primary Examiner*—David P Bryant
*Assistant Examiner*—Tai Nguyen
(74) *Attorney, Agent, or Firm*—Martin J. Moran

(57) ABSTRACT

A tool is provided for removing a circuit breaker from a mounting member or a housing. The tool includes a housing having a first end, a second end, a first side, a second side, a surface, and an axis. Disposed at the first end of the housing is a recess that is structured to receive the operating handle or actuator lever of the circuit breaker, while a number of apertures are disposed substantially adjacent to the second end of the housing. One or more mechanical fasteners extend through the apertures and secure the housing to the circuit breaker.

20 Claims, 6 Drawing Sheets

CIRCUIT BREAKER PULLOUT TOOL

BACKGROUND OF THE INVENTION

1. Field of the Invention

This invention relates generally to circuit breakers and, more particularly, to tools used with circuit breakers.

2. Background Information

A circuit breaker is an electrical switch that protects an electrical circuit from, for example, an overcurrent condition. Unlike a fuse, which has to be replaced after every overcurrent condition, a circuit breaker can be reset after an overcurrent condition. Once the circuit breaker has been reset, it can resume normal operation until it is exposed to another overcurrent condition at which time it will once again need to be reset.

Circuit breakers, which are manufactured in various sizes, can be installed into electrical circuits by a variety of methods. For instance, a stripped electrical conductor can be wound around a screw that is disposed on a surface of the circuit breaker housing thereby electrically connecting the circuit breaker to a power circuit. After the circuit breaker is electrically connected to the power circuit, the circuit breaker can be mounted to a separate housing by a clip that extends from a surface of the circuit breaker housing. Alternatively, as shown in FIG. 1, a circuit breaker 2 may be electrically connected to an electrical circuit by a number of bullet terminals 4 which are received into corresponding receptacles 6 that are disposed on a mounting member 8 that is electrically connected to the electrical circuit. The circuit breakers 2 that are depicted on FIG. 1 have a number of threaded apertures and/or inserts 10 that are disposed on a first end 12 of the circuit breaker 2. These threaded apertures 10 can be used to mount the electrical circuit breakers 2 to a mounting plate (not shown) that is positioned adjacent to the first end 12 of the circuit breaker 2. However, removing an installed circuit breaker from the housing or mounting member to which it is connected is often difficult and time consuming. Moreover, the act of removing a circuit breaker can often lead to damage to various components of the circuit breaker, such as the operating handle or actuator lever 14. Accordingly, there is a need for a tool that can be used to remove a circuit breaker without damaging any of the circuit breaker's components.

SUMMARY OF THE INVENTION

This need, and others, is met by embodiments of the invention which provide a tool for removing a circuit breaker.

In accordance with one aspect of the invention, a tool for removing a circuit breaker comprises: a housing having a first end, a second end, a first side, a second side, a surface, and an axis, the housing having a recess disposed at the first end and a number of apertures disposed at the second end, the apertures extending from the second end to the first end in a direction substantially parallel to the axis; and a number of mechanical fasteners extending through the apertures.

In accordance with another aspect of the invention, a tool is provided for removing a circuit breaker having a first end, an operating handle disposed on the first end, an axis, and a number of apertures disposed on the first end which extend in a direction substantially parallel to the axis. The tool comprises: a housing having a first end, a second end, a first side, a second side, and a surface, the housing having a recess disposed at the first end that is structured to receive the operating handle, the housing also having a number of apertures disposed at the second end which extend from the second end to the first end of the housing in a direction substantially parallel to the axis; and a number of mechanical fasteners extending through the apertures disposed at the second end of the housing, the mechanical fasteners being structured to be received into the apertures disposed on the first end of circuit breaker.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
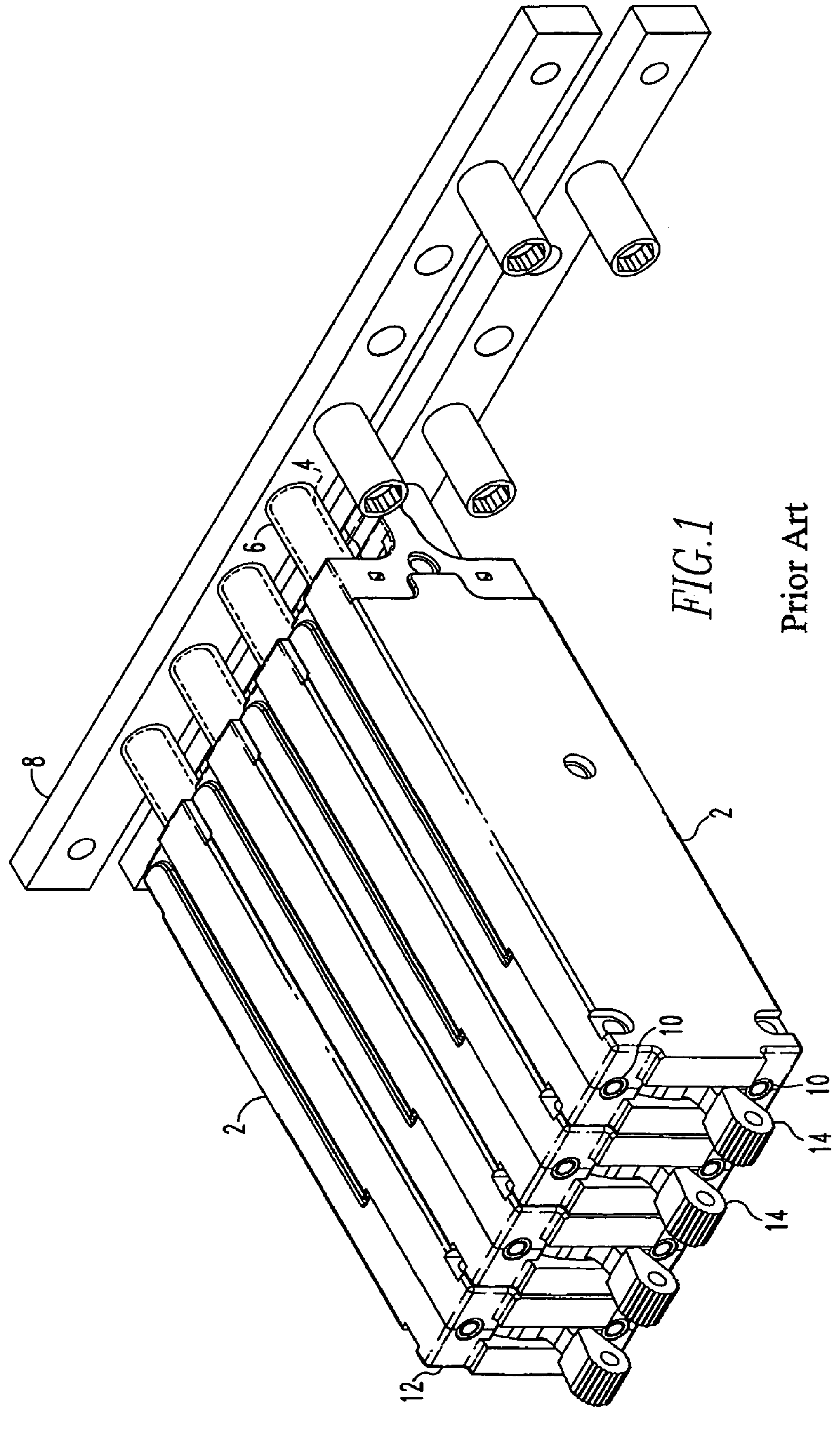
FIG. 1 Prior Art
FIG. 1 is an isometric view of circuit breakers mounted on a mounting member.

As employed herein, the term "number" means one or an integer greater than one (i.e., a plurality).

As employed herein, the term "mechanical fastener" or variations thereof shall refer broadly to any suitable fastening, connecting or tightening mechanism including, but not limited to, screws, bolts, and the combination of bolts and nuts.

Directional phrases used herein, such as, for example, upper, lower, left, right, vertical, horizontal, top, bottom, above, beneath, clockwise, counterclockwise and derivatives thereof, relate to the orientation of the elements shown in the drawings and are not limiting upon the claims unless expressly recited therein.

Figure 2A:
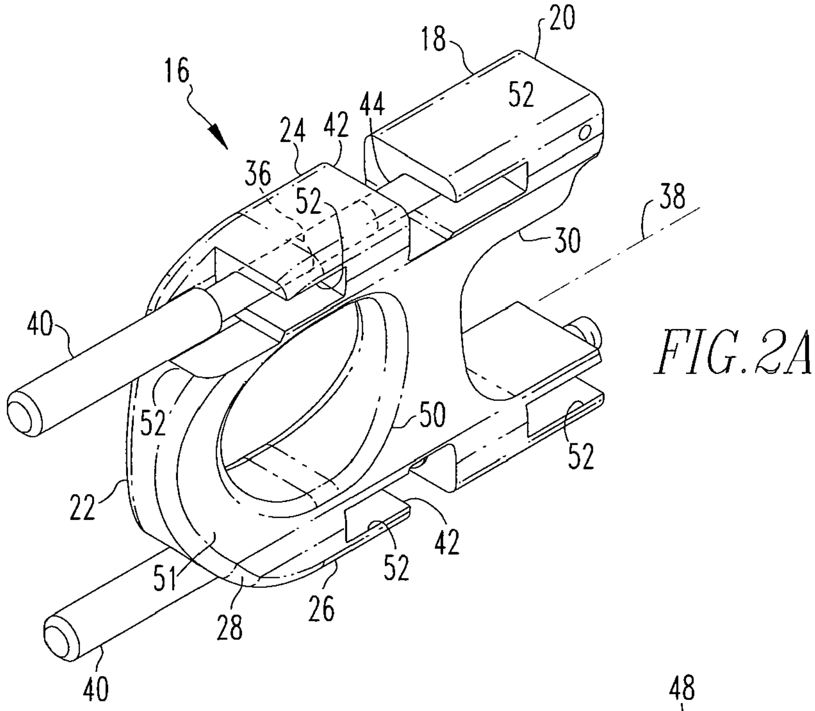
FIGS. 2*a* and 2*b* are isometric views of a pullout tool in accordance with an embodiment of the invention.
Figure 2B:
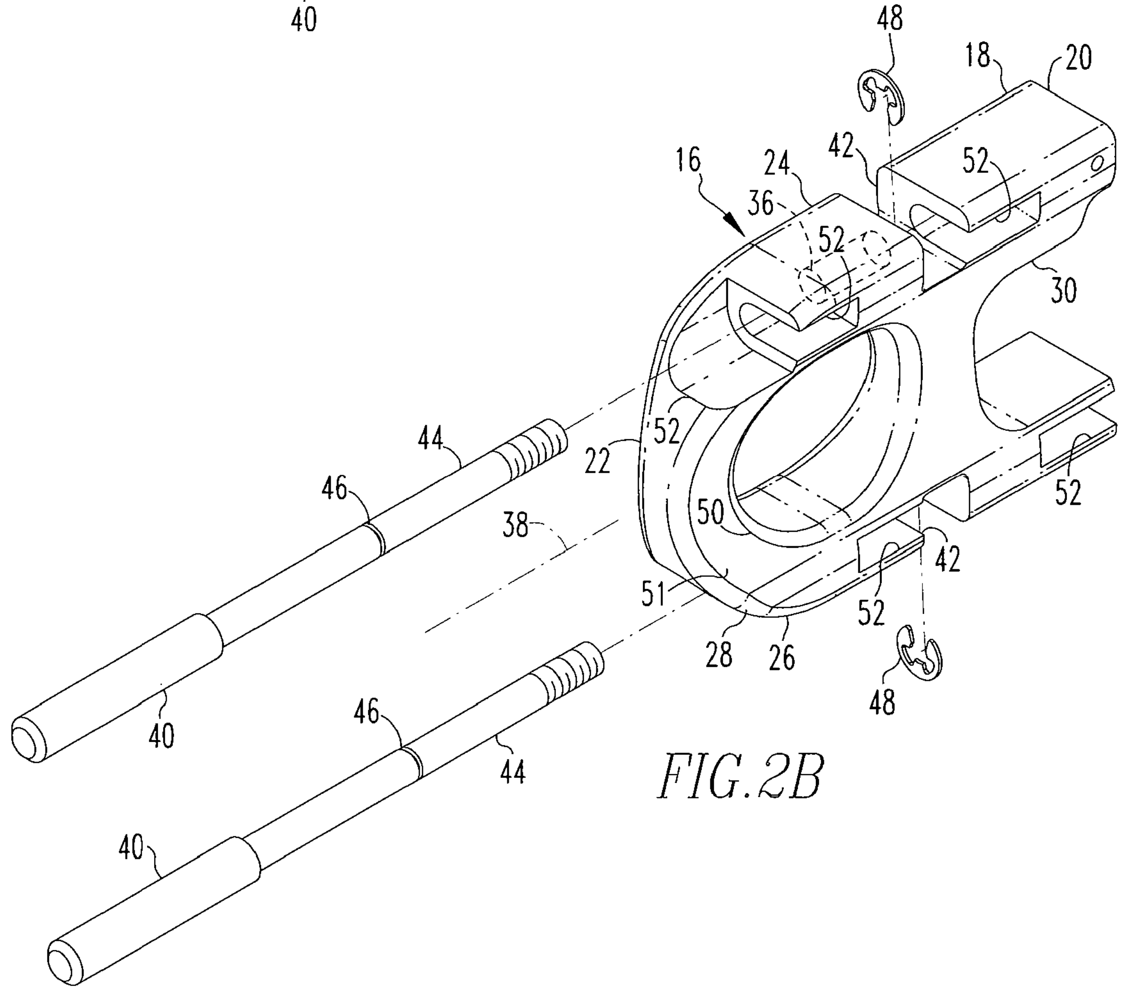
Figure 3:
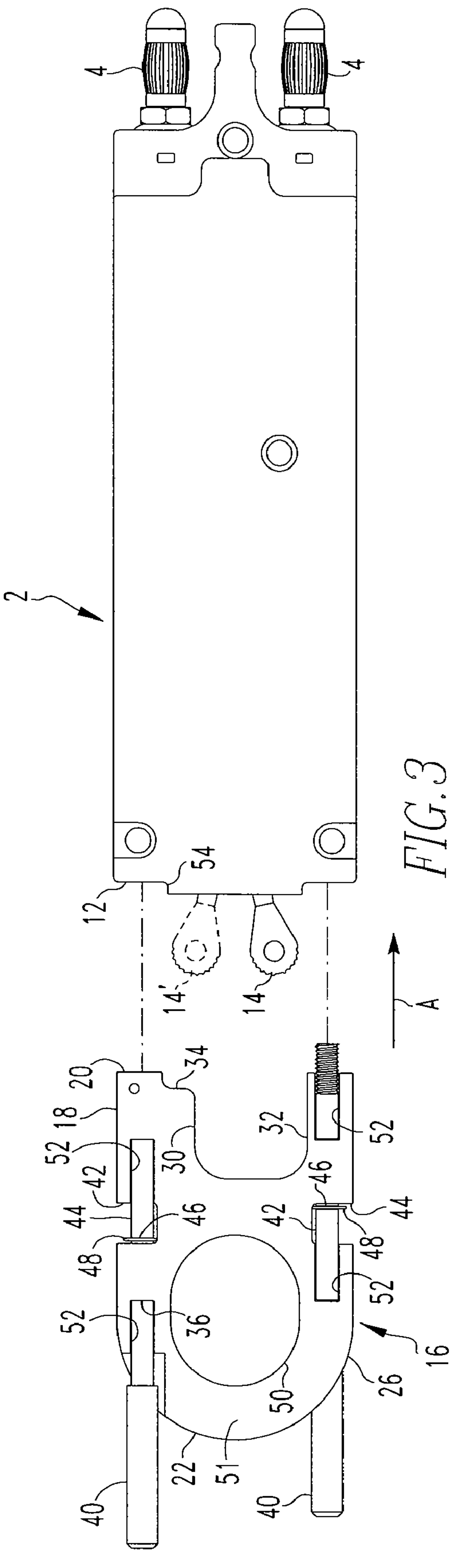
FIG. 3 is an exploded vertical elevation view of the pullout tool of FIGS. 2*a* and 2*b* and a circuit breaker.
Figure 4:
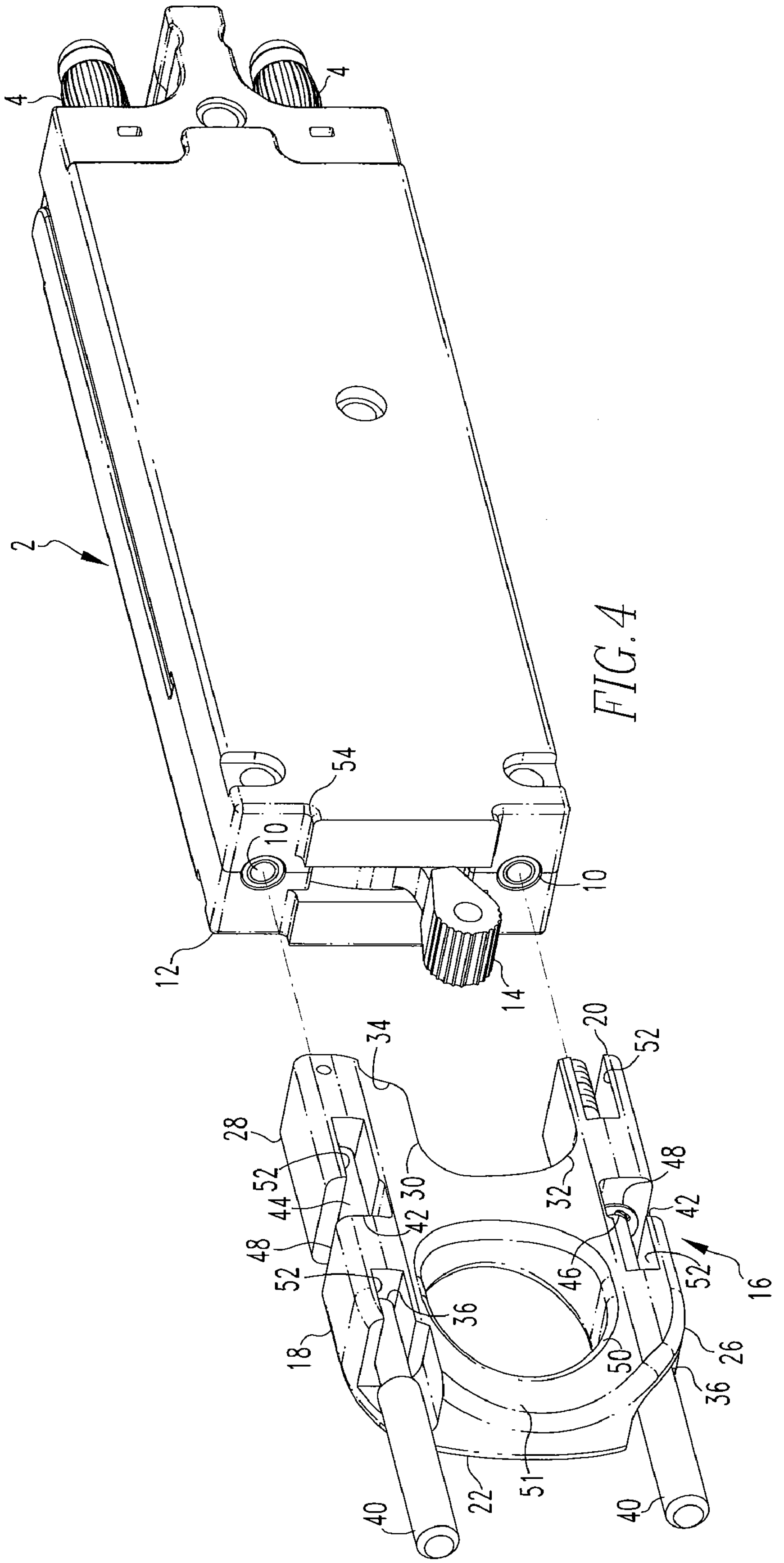
FIG. 4 is an isometric view of the pullout tool and circuit breaker of FIG. 3.

Referring to FIGS. 2*a*, 2*b*, and 3, a tool 16 includes a housing 18 having a first end 20, a second end 22, a first side 24, a second side 26, and a surface 28. Disposed at the first end 20 of the housing 18 is a recess 30 that is adapted to receive the operating handle or the actuator lever 14 of the circuit breaker 2 of FIG. 1. Referring to FIG. 3, in one embodiment of the invention, the recess 30 that is disposed on the first end 20 of the housing 18 is comprised of a primary recess 32 and a secondary recess 34. Continuing to refer to FIGS. 2*a* and 2*b*, disposed at the second end 22 of the housing 18 are a number of apertures 36 that extend from the second end 22 of the housing 18 to the first end 20 of the housing 18. It should be noted, however, that despite FIGS. 2*a*, 2*b*, and 3-6 depicting the second end 22 of the housing 18 as having a substantially arcuate shape, the shape of the second end 22 is not meant to be limiting and the second end 22 can, for example, also be substantially rectangular in shape or any suitable shape as well.

As can be seen from these figures, the apertures 36 extend in a direction that is substantially parallel to an axis 38 of the housing 18. As will be discussed in greater detail below, the apertures 36 that are disposed on the housing 18 are adapted to receive a mechanical fastener 40 which is used to secure the housing 18 to the circuit breaker 2. Disposed on each of the first and second sides 24,26 of the housing is a recess 42. As best shown in FIG. 3, when a mechanical fastener 40 is extended through the aperture 36, a portion of the mechanical fastener' surface 44 is exposed in the recess 42 that is disposed on the first and second sides 24,26 of the housing 18. In the embodiment that is depicted in these figures, the surface 44 of the mechanical fastener 40 that is exposed has a recess 46 that is structured to receive a clip 48 which secures the mechanical fastener 40 to the housing 18. In another embodiment of the invention, the mechanical fastener 40 can be secured to the housing 18 by threads (not shown) that extend along a portion of the surface 44 of the mechanical fastener 40 which are structured to mechanically engage threads (not shown) that are disposed on the surface of the housing 18 that define the aperture 36.

Disposed on the surface 28 of the housing 18 substantially adjacent to the second end 22 of the housing 18 is an opening 50. As will be discussed in greater detail below, the opening 50 can be used as a gripping member to apply a load to the housing 18, when the housing 18 is secured to the circuit breaker 2, thereby facilitating the removal of the circuit breaker 2 from the mounting member 8 (FIG. 1) or the housing to which it is connected. Additionally, the portion 51 of the housing 18 between the opening 50 and the second end 22 of the housing 18 can be contoured so that the housing 18 can be more easily used as a gripping member. In one embodiment of the invention, the opening 50 is disposed substantially adjacent to the recesses 42 that are disposed on the first and second sides 24,26 of the housing 18. The tool 16 may also include a number of niches 52 that are disposed on the surface 28 of the tools' 16 housing 18. In the embodiment that is depicted in FIGS. 2*a* and 2*b*, the niches 52 are disposed substantially adjacent to the first and second sides 24,26 of the housing 18.

Prior to securing the housing 18 to the circuit breaker 2, the apertures 36 that are disposed in the housing 18 are aligned with the threaded apertures 10 (FIG. 1) that are disposed on the first end 12 of the circuit breaker 2. As the apertures 36 that are disposed on the housing 18 are aligned with the apertures 10 on the circuit breaker 2, the operating handle or actuator lever 14 that extends from the first end 12 of the circuit breaker 2 is received into the recess 30 that is disposed on the first end 20 of the housing 18 as the housing 18 is moved towards the circuit breaker 2 in the direction of arrow A. If the operating handle or actuator lever 14 is in the "off" position (FIGS. 3 and 4), then it will be received into the primary recess 32. If the operating handle or actuator lever 14' is in the "on" position (FIG. 3), then the operating handle or actuator lever 14' will come into contact with the secondary recess 34 as the housing 18 is moved towards the circuit breaker 18. The shape of the secondary recess 34 will then force the operating handle or actuator lever 14' to the "off" position (reference #14) prior to the housing 18 coming into contact with the circuit breaker 2, thereby ensuring that circuit breaker 2 is not energized. It should be noted, however, that in other embodiments of the invention, the secondary recess 34 does not force the operating handle or actuator lever 14 into the "off" position.

After the apertures 10,36 on the circuit breaker 2 and the housing 18 are aligned 18 (FIGS. 3 and 4), and the operating handle or actuator lever 14 received into the primary recess 32, a number of mechanical fasteners 40 are extended through the apertures 36 in the housing as well as though the apertures 10 in the circuit breaker 2. Disposed on the surface 44 of the mechanical fastener 40 is a thread that mechanically engages the aperture 10 that is disposed on the circuit breaker 2, thereby securing the housing 18 to the circuit breaker 2.

Figure 5:
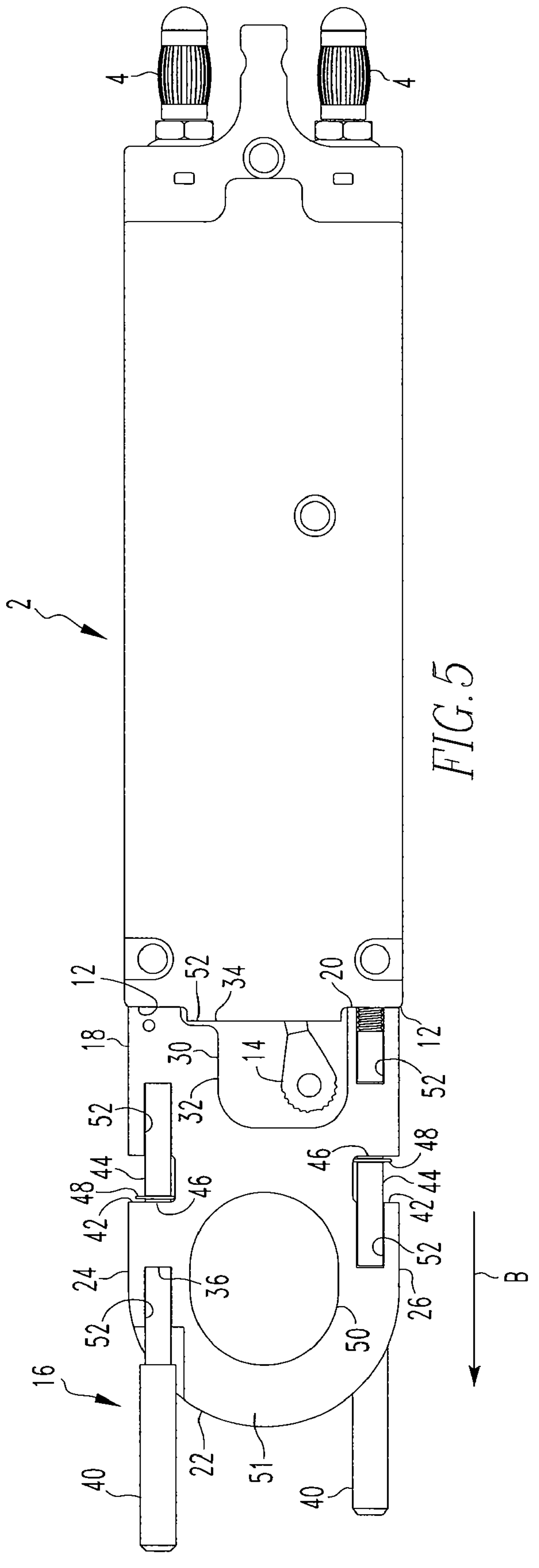
FIG. 5 is a view of the pullout tool of FIGS. 2*a* and 2*b* secured to a circuit breaker.
Figure 6:
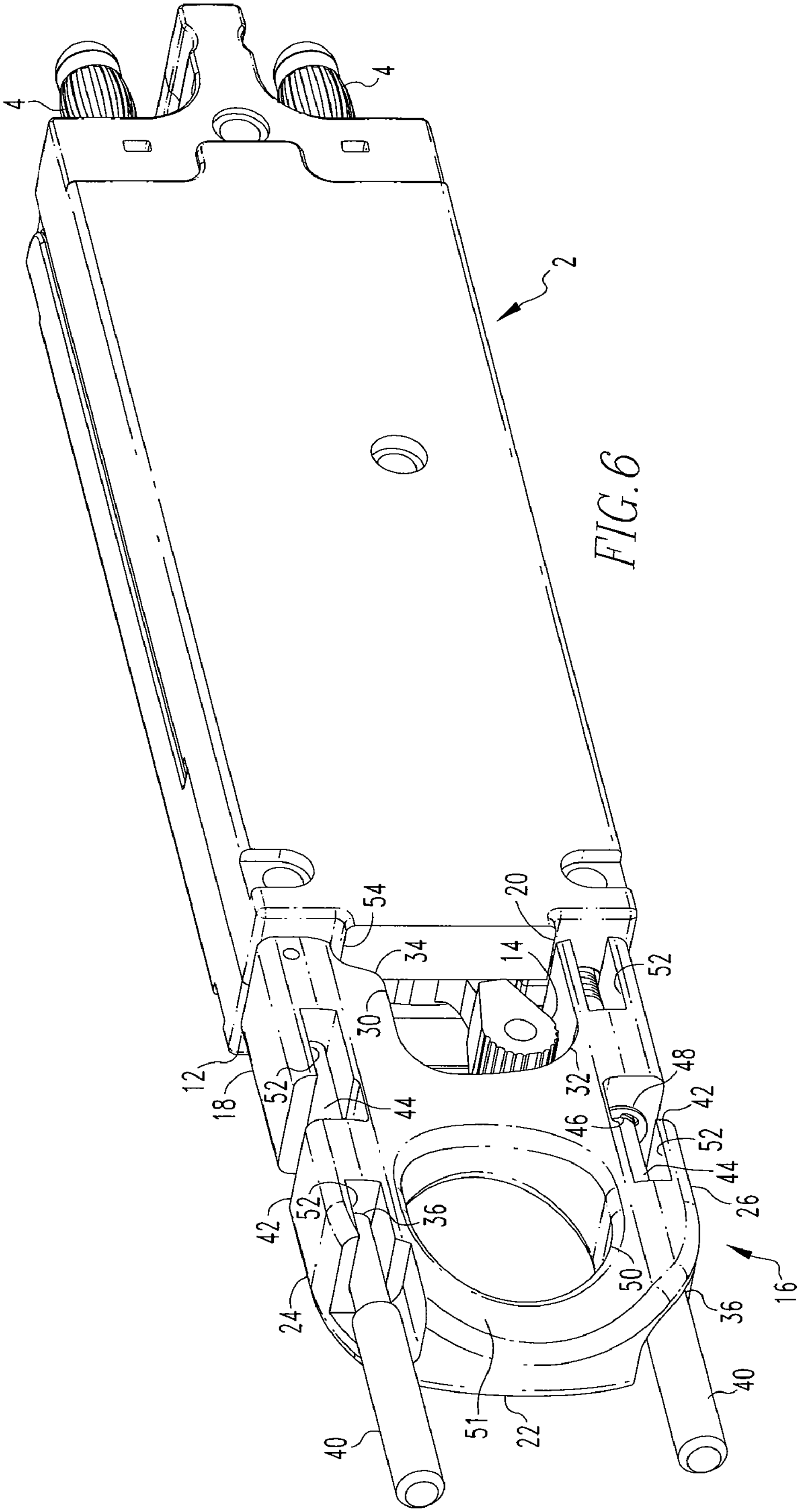
FIG. 6 is an isometric view of the pullout tool and circuit breaker of FIG. 5.

Referring to FIGS. 5 and 6, once the housing 18 is secured to the circuit breaker 2 by the mechanical fasteners 40, which are secured to the housing 18, a force can be applied to the housing 18, in a direction of arrow B (FIG. 5), in order to disconnect the circuit breaker 2 from the mounting member 8 (FIG. 1) or the housing to which it is connected. The application of the force can be achieved in a variety of ways. For instance, an individual's finger(s) or a protruding member of a tool may be inserted through the opening 50 that is disposed on the surface of the housing 18, thereby allowing the individual or the tool to apply a force in a direction of arrow B. Alternatively, an individual or tool may grab the entire housing 18 before application of the force in a direction of arrow B. Because the housing 18 is secured to the mechanical fasteners 40, which are secured to the circuit breaker 2, movement of the housing 18 in the direction of arrow B will translate to movement of the circuit breaker 2 in the direction of arrow B as well. Accordingly, the circuit breaker 2 will become disconnected from the mounting member 8 or the housing to which it is connected after a sufficient force has been applied to the housing 18.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A tool for removing a circuit breaker, said tool comprising: a housing having a first end, a second end, a first side, a second side, a first surface, a second surface, and an axis, said housing having a recess disposed at said first end for receiving an actuating lever of said circuit breaker, and a number of apertures disposed at said second end, said apertures extending from said second end to said first end in a direction substantially parallel to said axis; and a number of mechanical fasteners extending through said apertures, wherein said first surface extends from said first side to said second side, wherein said second surface extends from said first side to said second side, wherein a thickness separates said first surface from said second surface, wherein said housing further has an opening disposed through said first and second surfaces and through said thickness between said first surface and said second surface, and wherein said housing along said opening is structured to provide a gripping member.

2. The tool according to claim 1, wherein said mechanical fasteners have a surface; and wherein said housing further has a recess disposed on said first and second sides whereby a portion of the surface of said mechanical fasteners is exposed.

3. The tool according to claim 2, wherein a recess is disposed on said surface of said mechanical fasteners.

4. The tool according to claim 3, wherein a clip is received into said recess on said surface of said mechanical fasteners thereby securing said mechanical fasteners to said housing.

5. The tool according to claim 1, wherein said opening is positioned substantially adjacent to said second end of said housing.

6. The tool according to claim 1, wherein said opening is centrally located on said housing and said mechanical fasteners have a surface; and wherein said housing further has a recess disposed on said first and second sides whereby a portion of said surface of said mechanical fasteners is exposed, each of said recesses being positioned substantially adjacent to said opening.

7. The tool according to claim 1, wherein said second end is substantially arcuate.

8. The tool according to claim 1, wherein said circuit breaker has a first end and a number of apertures disposed on said first end; and wherein said mechanical fasteners are structured to engage said circuit breaker at said apertures thereof.

9. The tool according to claim 1, wherein a portion of said housing between said opening and the second end of said housing is contoured in order to form said gripping member.

10. The tool according to claim 1, wherein a portion of said housing along said opening is contoured in order to form said gripping member.

11. A tool for removing a circuit breaker, said circuit breaker having a first end, an operating handle disposed on said first end, an axis, and a number of apertures disposed on said first end, said apertures extending in a direction substantially parallel to said axis, said tool comprising:

a housing having a first end, a second end, a first side, a second side, and a first surface, a second surface, said housing having a recess disposed at said first end that is structured to receive said operating handle, said housing also having a number of apertures disposed at said second end which extend from said second end to said first end of said housing in a direction substantially parallel to said axis; and a number of mechanical fasteners extending through said apertures disposed at said second end of said housing, said mechanical fasteners being structured to be received into said apertures disposed on said first end of said circuit breaker, wherein said first surface extends from said first side to said second side, wherein said second surface extends from said first side to said second side, wherein a thickness separates said first surface from said second surface, wherein said housing further has an opening disposed through said first and second surfaces and through said thickness between said first surface and said second surface, and wherein said housing along said opening is structured to provide a gripping member.

12. The tool according to claim 11, wherein said mechanical fasteners have a surface; and wherein said housing further has a recess disposed on said first and second sides whereby a portion of said surface of said mechanical fasteners is exposed.

13. The tool according to claim 12, wherein a recess is disposed on the surface of said mechanical fasteners.

14. The tool according to claim 13, wherein a clip is received into said recess disposed on the surface of a corresponding one of said mechanical fasteners thereby securing said corresponding one of said mechanical fasteners to said housing.

15. The tool according to claim 11, wherein said opening being positioned substantially adjacent to said second end.

16. The tool according to claim 11, wherein said opening is centrally located on said housing and said mechanical fasteners have a surface; and wherein said housing further has a recess disposed on said first and second sides whereby a portion of said surface of said mechanical fasteners is exposed, each of said recesses being positioned substantially adjacent to said opening.

17. The tool according to claim 11, wherein said second end of said housing is substantially arcuate.

18. The tool according to claim 11, wherein a portion of said housing between said opening and the second end of said housing is contoured in order to form said gripping member.

19. The tool according to claim 11, wherein a portion of said housing along said opening is contoured in order to form said gripping member.

20. A circuit breaker apparatus comprising:

a mounting member;

a circuit breaker mounted to said mounting member; and a circuit breaker removal tool comprising:

a housing having a first end, a second end, a first side, a second side, a first surface extending from said first side to said second side, a second surface extending from said first side to said second side, a thickness separating said first surface from said second surface, an opening disposed through said first and second surfaces and through said thickness between said first surface and said second surface, an axis, a recess disposed at said first end for receiving an actuating lever of said circuit breaker, and a number of apertures disposed at said second end, said apertures extending from said second end to said first end in a direction substantially parallel to said axis, and a number of mechanical fasteners extending through said apertures, wherein said housing along said opening is structured to provide a gripping member, in order to apply a load to said housing to remove said circuit breaker from said mounting member.

* * * * *